Feb. 26, 1924.

J. C. MITCHELL

PROCESS AND APPARATUS FOR MAKING CENTRIFUGAL CONCRETE PIPES

Filed April 28, 1922    7 Sheets-Sheet 1

1,485,142

Inventor
John C. Mitchell
By his Attorneys
Cooper, Kerr & Dunham

J. C. MITCHELL 1,485,142

PROCESS AND APPARATUS FOR MAKING CENTRIFUGAL CONCRETE PIPES

Filed April 28, 1922 7 Sheets-Sheet 6

Inventor
John C. Mitchell
By his Attorneys
Cooper, Kerr & Dunham

Feb. 26, 1924.                                                      1,485,142
J. C. MITCHELL
PROCESS AND APPARATUS FOR MAKING CENTRIFUGAL CONCRETE PIPES
Filed April 28, 1922                       7 Sheets-Sheet 7

Inventor
John C. Mitchell
By his Attorneys
Cooper, Kerr & Dunham

Patented Feb. 26, 1924.

1,485,142

UNITED STATES PATENT OFFICE.

JOHN C. MITCHELL, OF EAST ORANGE, NEW JERSEY, ASSIGNOR TO LOCK JOINT PIPE COMPANY, OF AMPERE, NEW JERSEY, A CORPORATION OF NEW JERSEY.

PROCESS AND APPARATUS FOR MAKING CENTRIFUGAL CONCRETE PIPES.

Application filed April 28, 1922. Serial No. 557,123.

*To all whom it may concern:*

Be it known that I, JOHN C. MITCHELL, a citizen of the United States of America, residing at East Orange, in the county of Essex and State of New Jersey, have invented certain new and useful Improvements in Processes and Apparatus for Making Centrifugal Concrete Pipes, of which the following is a full, clear, and exact description.

One of the most remarkable and exceptionally valuable contributions to hydraulic engineering, if it be properly made, is what is commonly known as centrifugal concrete pipe, or pipe composed of concrete molded in a suitable form centrifugally. Theoretically the production of such pipes, whether without or with the reinforcements required to give them the necessary strength, is not a matter of much difficulty, but the practical requirements of pipe lines for carrying water demand not only imperviousness to fluid under pressure, and great strength to resist both external and internal stresses, but a smoothness of interior finish which will not oppose too high a frictional resistance to the flow of the water or other fluid. Unless all of these properties be present to a very perfect degree, such pipes lose their advantages over cast iron or other forms of pipe that are equally available even if more expensive to produce.

Recognizing these requirements I have devoted much time and study to the subject and as the result of many experiments and tests I have devised an apparatus and a process for the manufacture of centrifugal concrete pipes which form the subject of this application for Letters Patent and which produce such pipes more nearly ideal in character than any that have come under my observation. For a more ready understanding of this invention and the nature of the results which it yields, let it be assumed that a form or tubular mold be mounted so as to be capable of a relatively rapid rotation, and that a given quantity of concrete be introduced therein. By centrifugal force the concrete is thrown outwardly against the wall of the mold and may be assumed to spread in a layer of approximately uniform thickness over such wall. In a relatively short time the concrete solidifies and all of its lighter constitutents coming to the inner surface of the tube, such constitutents comprising water, froth, laitance, and the lighter solid particles. Heretofore this has been practically the extent of the process carried out in the making of these pipes, but when the concrete has hardened or dried, the inner surface of the pipe is rough, uneven, and not of the same density as the remainder, and this makes the pipes unsuitable for many purposes where the frictional resistance to internal flow is a factor in the ultimate purpose of the pipes. This objection might, in a measure, be removed, but only by means which prohibitively increase the cost of the finished product.

It has been proposed to smooth off the interior surface of these pipes before the cement has hardened by a scraper with a rigid edge applied thereto, but if the speed of rotation of the pipe and the force due to momentum be considered, it will be at once seen what has been amply demonstrated in practice that this is entirely impracticable.

To avoid this I remove by a wiping action the laitance and other objectional matter from the surface of the pipe during the molding process, thus leaving a surface of pure concrete only, and over this cleaned surface I then flow a small amount of neat cement, with or without sand and water or other suitable material to form a surface coating a fraction of an inch in thickness and before it has fully set or before the rotation of the mold is stopped I clean this surface of the water and lighter impurities which collect on it by means of a brush or some soft body that will clean and polish the surface. Pipes made in this way are of very high grade, possessing not only the valuable properties of centrifugal concrete, but having a very hard smooth interior surface which opposes only a negligible frictional resistance to water flowing over it.

To practically accomplish all the steps necessary in carrying out my novel process a somewhat elaborate apparatus is desirable, though in all particulars not essential, and in the drawings hereto annexed I have illustrated such apparatus in full detail. To these drawings I now refer.

In the practical carrying out of the invention I employ a duplex arrangement of molds and other devices whereby while one mold is rotating to permit the introduced concrete to solidify, the concrete for another mold may be mixed and got ready so that the second or other mold may be filled as soon as the first is removed with its set filling, and so on without any interruption in the process. As each mold, with its accessories, is, however, the counter-part of another the description will be confined to one only.

Figure 11:
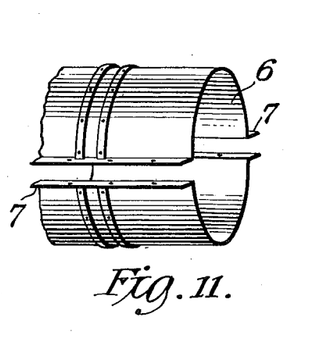

For the proper installation and support of the essential parts of the device I employ a strong framework 1. In the forward part of this frame are two grooved pulleys 2, 3, driven by suitable power and carrying endless belts of wire rope 4, or the like, which surround grooved pulleys or projections 5 on the mold 6. The mold is a plain cylinder in two or more parts which, as shown in Fig. 11, have longitudinal flanges 7, which are clamped by bolts to complete the cylinder and which may be readily taken apart for the removal of a set and hardened tube.

Figure 9:
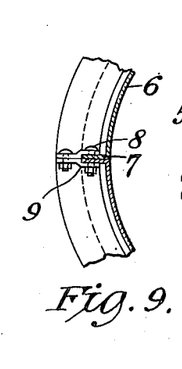
Figs. 9, 10 and 11 are details of molds showing the manner of forming the joints.
Figure 10:
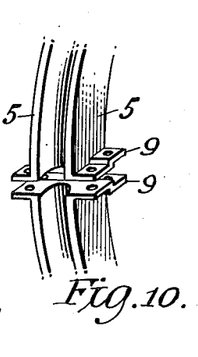
Figures 12, 13, 14, 15:
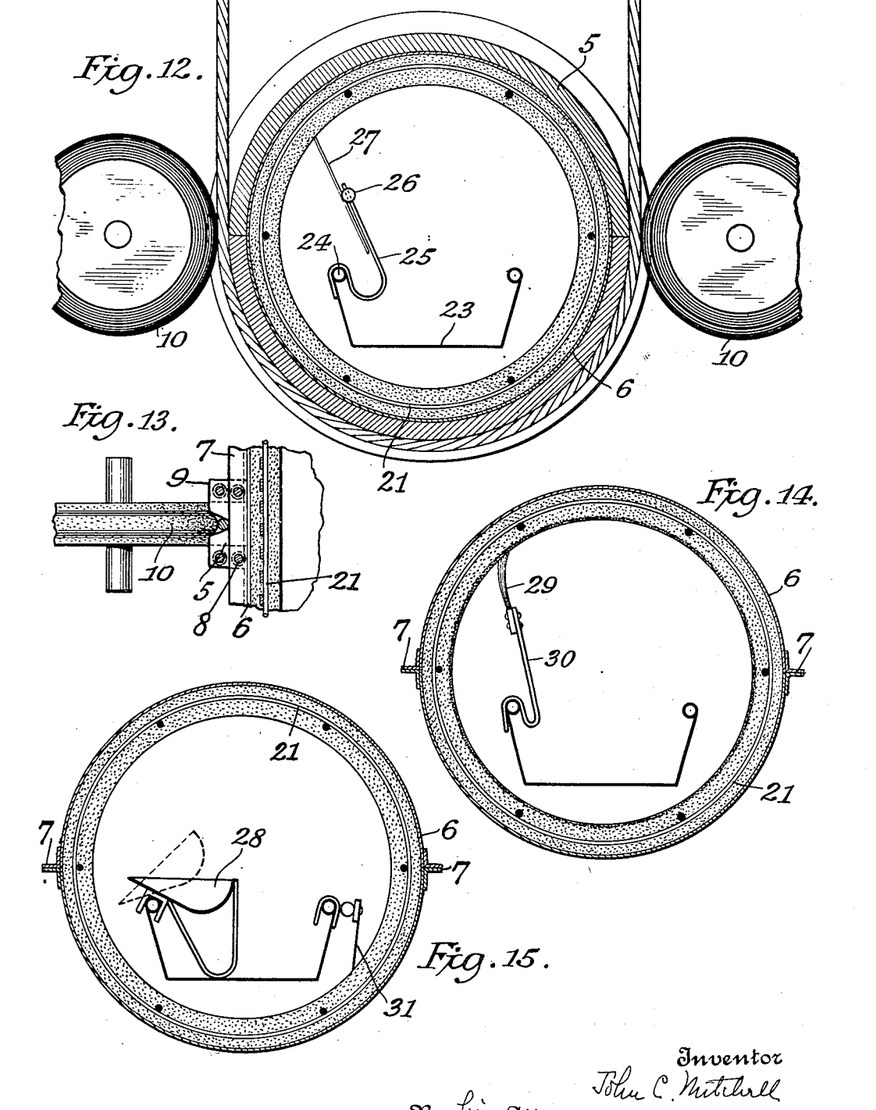
Fig. 12 is an enlarged transverse section of the mold, its means of support, and the cleaning device inserted therein.
Fig. 13 is an enlarged sectional detail of that part of the mold with which the steadying rollers engage.
Fig. 14 is an enlarged sectional view of a concrete tube in the mold showing the finishing or polishing brush aplied thereto.
Fig. 15 is a similar view showing the means for introducing the layer of neat cement of finishing coat to the interior of the concrete tube.

The annular raised portions 5, which constitute the pulleys, are secured to the mold by rivets 8, which secure flanges 9 on said portions to the flanges 7, as shown in Figs. 9 and 10. The mold is slung in and supported by the endless belts 4 and rotated thereby. To steady it in operation, wheels 10, which are preferably elastic, yielding or flexible, that is to say, wheels that yield either at the point of contact or in their bearings, are mounted on the frame on opposite sides of the mold, and in order to prevent undue side sway or end thrust, enter the grooves in the pulleys 5 over the endless belts, as shown in Figs. 12 and 13.

In order that the wheels 10 should most effectively exert their allotted function they are provided with rubber tires or rims, but under all ordinary circumstances the degree to which they should yield is very slight.

Figure 1:
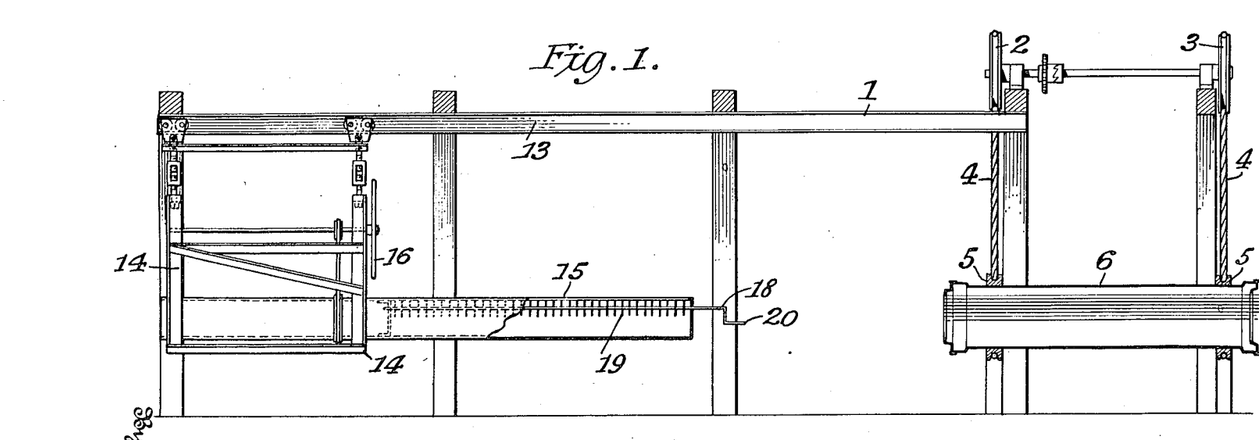
Fig. 1 is a view partly in elevation and partly in section of the principal devices necessary in carrying out the process.
Figure 2:
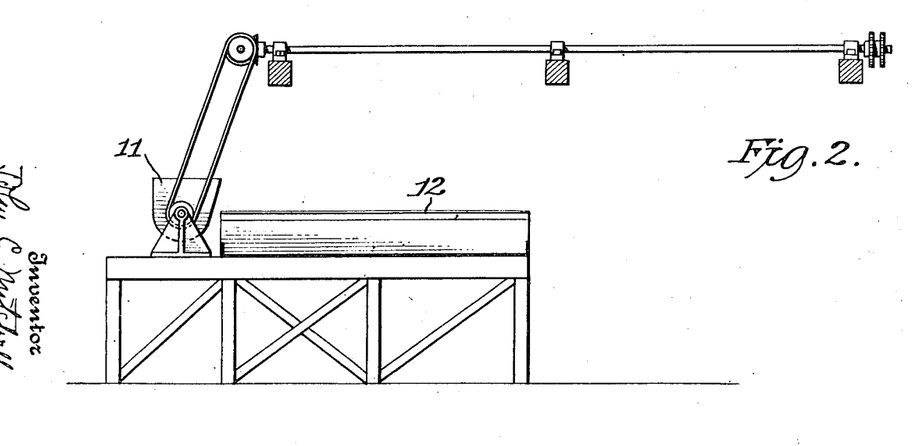
Fig. 2 is a similar view of means for mixing and delivering concrete to the apparatus.
Figure 3:
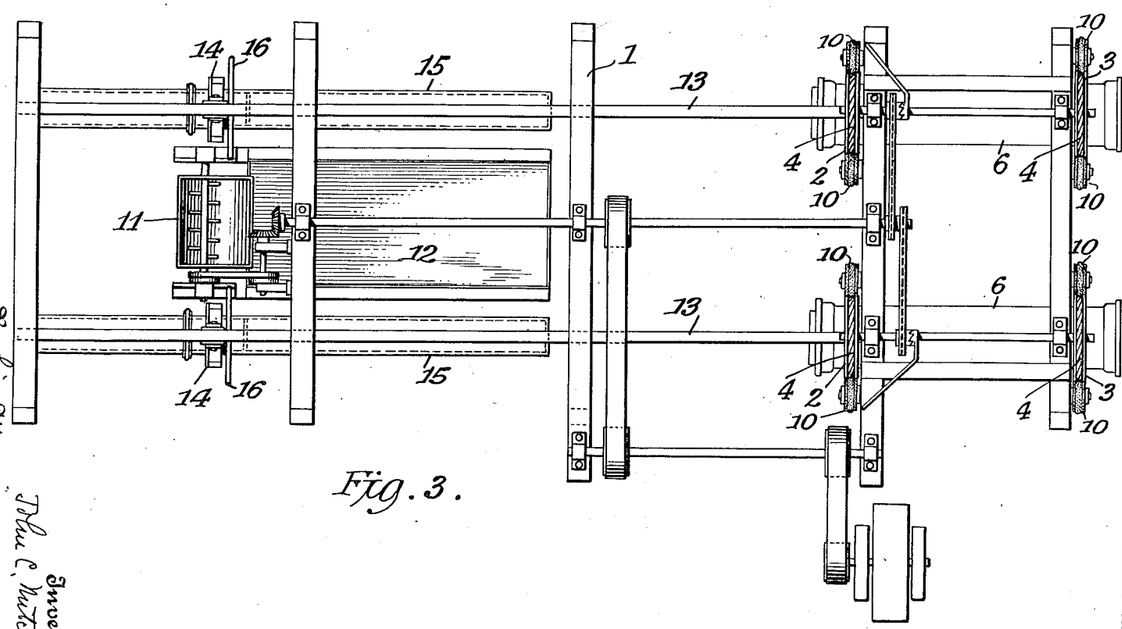
Fig. 3 is a top plan view of a complete apparatus designed to carry out the invention.
Figure 7:
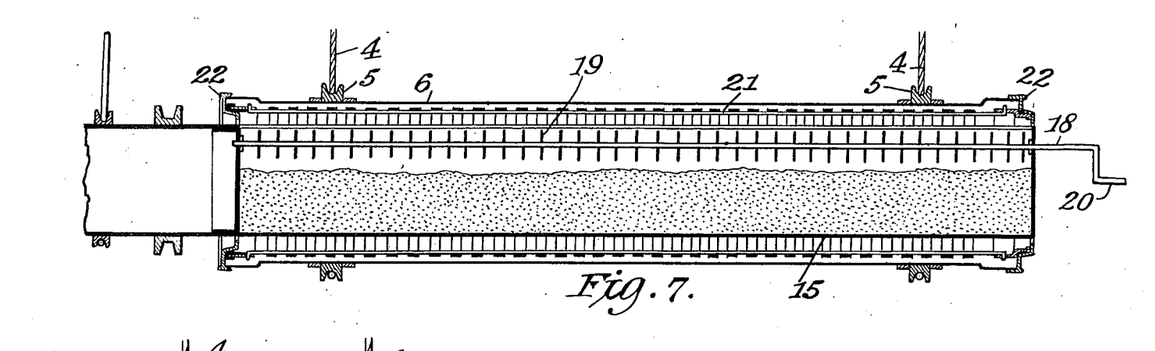
Fig. 7 is a longitudinal section of the mold and container which introduces the concrete, in position in the mold.

At the rear of the frame is arranged a concrete mixer 11, and a trough 12, into which charges of mixed concrete in proper amount are dumped. On tracks 13 carried by the frame is suspended a cradle 14, carrying a counterweighted cylinder or receptacle 15, of a length substantially equal, beyond said cradle, to that of the mold. This cylinder or receptacle, shown in detail in Fig. 7, is mounted concentrically with the mold 6 and in position to be moved into the same by means of the cradle 14. Normally it lies alongside the trough 12, from which it is filled with the exact amount of concrete required to form a pipe section, and it is so supported that it may be rotated about its axis by means of a hand wheel 16, Fig. 1, which is connected to the cylinder by a belt and pulleys or by any other well known means.

Figure 4:
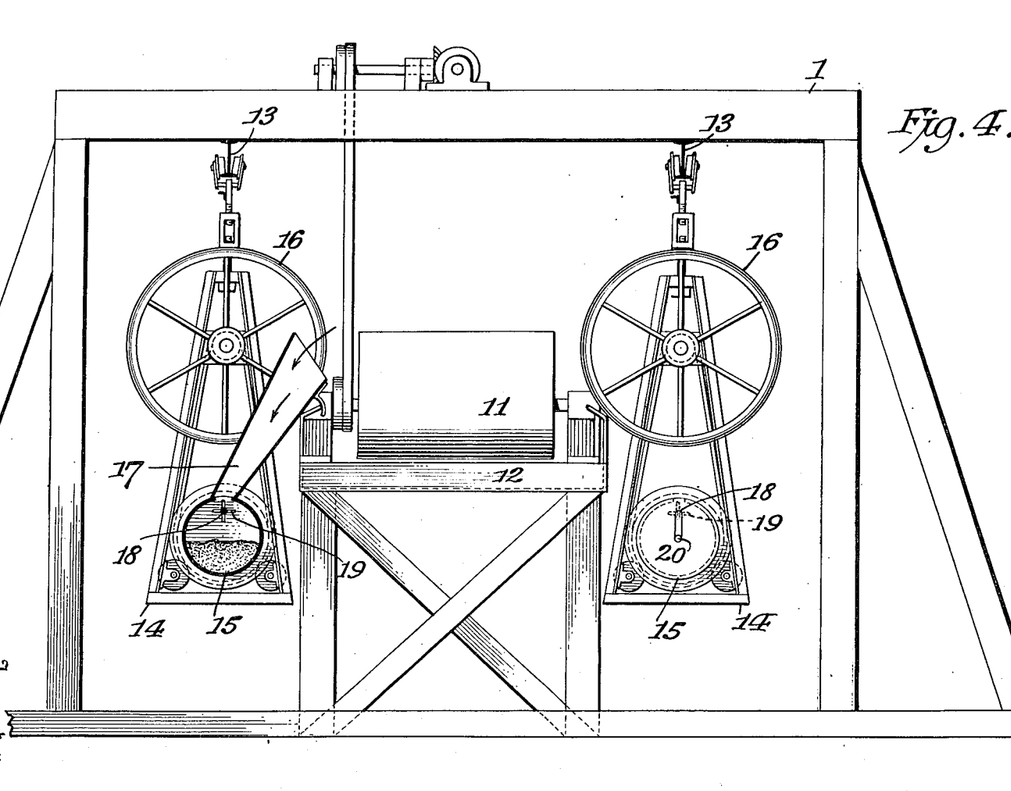
Fig. 4 is a part vertical section and part elevation of the portions of the apparatus for delivering the mixed concrete.
Figure 5:
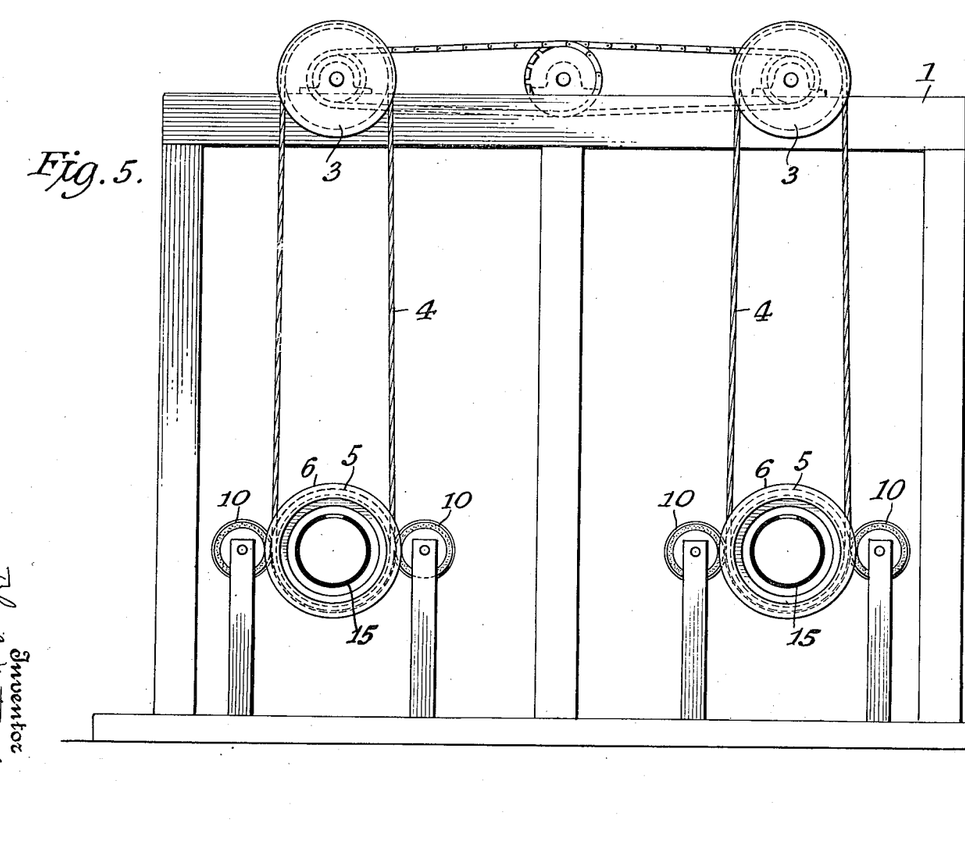
Fig. 5 is an end view in elevation of the molds and means of support therefor.
Figure 8:
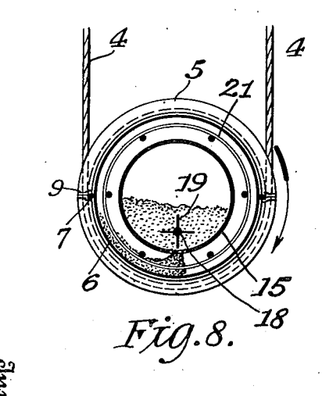
Fig. 8 is a transverse section of the mold with the container in place therein.

The cylinder 15, as shown in Figs. 4 and 8, contains a longitudinal slot through which it is filled by any suitable funnel-shaped appliance 17, Fig. 4, and until it is forced forward into the mold it occupies the position shown in this figure, with the slot at the top. Through the cylinder 15 extends a shaft 18 carrying arms or blades 19, constituting a stirrer which shaft may be rotated, whenever desired, by a handle 20.

To mold a pipe section by means of this apparatus the exact predtermined amount of concrete required to form it is mixed and run into the cylinder 15. The mold, in which the reinforcements 21 are placed, and having placed over its ends flanges 22, the internal diameters of which are less than that of the completed pipe section, is swung in the endless belts 4 and started in rotation. The cylinder 15 is then forced forward into the mold and by the hand wheel 16 turned to gradually deliver its contents into the mold. While this operation is going on the shaft 18 is rotated whereby the concrete is delivered evenly and properly through the slot in the cylinder. By centrifugal force the concrete is thrown out against the inner wall of the mold, and after the entire contents of the cylinder 15 have been delivered, the latter is withdrawn to its first or normal position.

Figure 6:
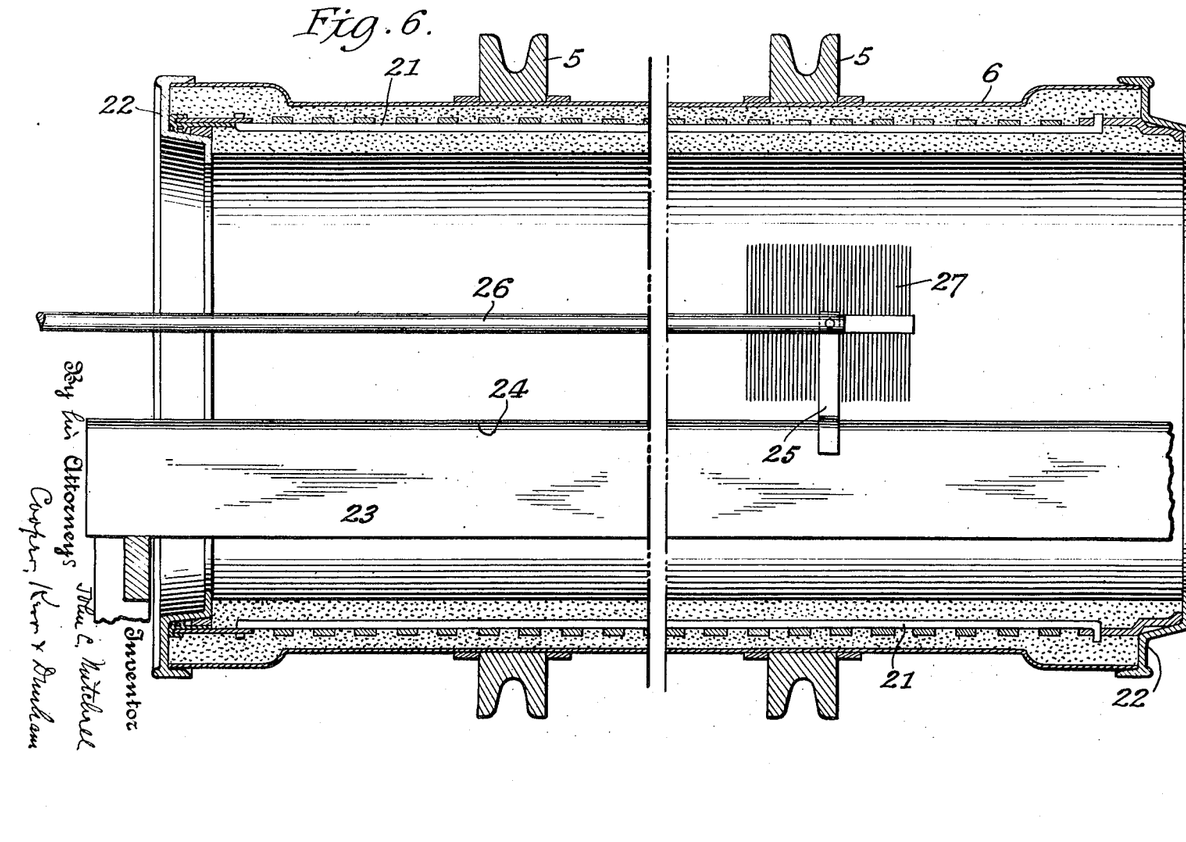
Fig. 6 is an enlarged longitudinal section of a mold containing a filling of concrete, showing also the means for cleaning the interior surface of the tube.

Under ordinary conditions the concrete will have solidified sufficiently in the rotating mold in about fifteen or twenty minutes, when a trough 23 is passed into or through the mold with the pipe section formed therein, this trough being of sufficient length to extend entirely through the same and to rest on fixed supports by which it is supported therein about the relative position shown in Figs. 12 and 14. This trough has rounded bars 24 along its edges, one of which serves as a guide for a properly shaped support 25, Figs. 6 and 12, attached to a long rod 26 carrying a stiff wire brush or similar wiper 27. This rod is introduced into the tube and forced back and forth with the brush or wiper lying against the inner surface of the tube, with the result that the water and all the soft material concentrated on the said surface is thrown off into the trough 23, leaving the solid concrete surface clean.

The next step is to fill a long trough 28, Fig. 15, with neat cement or other material for finishing coat, and pass this into the tube, utilizing the side bar of the trough 23 as a guide as shown. When this trough is fully inserted, it is tipped, as shown in dotted lines, to deliver its contents onto the inner surface of the concrete tube. By the same centrifugal action this cement is flowed evenly over the surface of the tube to form a coating a fraction of an inch in thickness, which quickly solidifies. As soon as it has sufficiently set, the trough 28 having been withdrawn, a softer brush 29, with a support 30, is introduced and guided by the side rod of the trough 23. This brush may be of any width desired. Its function is merely to remove the water from the surface of the cement or any light impurities that may collect there, and to impart to the solid cement surface a smooth finish. If this finish is not sufficiently smooth another soft brush 31 may be passed over the inner surface along the other side bar of the trough 23, as shown in Fig. 15.

After having gone through with the above described operations, the trough 23 is withdrawn, the mold stopped and removed to give place to another and empty mold, and laid aside for a sufficient time to permit the concrete tube to thoroughly harden, when the mold is removed from the tube.

The unessential details of the apparatus I have not deemed it necessary to describe in any detail. These are the means for imparting rotation to the parts requiring such movement; the means for stopping and starting the various parts in rotation; the means for removing or replacing the molds; the means for supporting the trough in the tube and the like, as all of these are matters well within the knowledge of anyone skilled in this art. The features which are essential to and characteristic of my new process, however, and by whatever means they may be carried out, are as follows:

1. The removal of water and all deleterious matter from the interior surface of the concrete tube by a wiping as distinguished from a scraping or cutting action.
2. The application to such surface of a thin finishing coating of neat cement or other suitable material.
3. The removal of the water from this cement and the smoothing or polishing of its surface before hardening.
4. All of the above operations are carried on continuously and without the necessity of interrupting the rotation of the pipe.

The most important features which distinguish the apparatus which I have devised for carrying out this process are as follows:

No fixed bearings for or under the molds are employed but the latter are slung in endless belts and rotated thereby, and are maintained in their proper position by steadying wheels.

It has been found that the interior of centrifugally formed concrete pipes cannot be smoothed, trued or finished by any rigid body applied thereto and which is designed to remove any part of the surface by what I now term a scraping or cutting action. I have found that whatever means be employed for truing or finishing these surfaces but be capable of yielding in the direction of rotation of the mold so as to exert what I term a wiping action is suitable. The distinction is the same in principle as plough or tool cutting on the one hand and sweeping on the other, and it is only by sweeping or wiping that the proper and desired portions of the surface can be removed to leave a substantially even or true surface. The failure of previous apparatus for this purpose has been largely due to this radical defect. It is impossible to preserve for any appreciable time any ordinary form of stationary bearing about a machine of this nature. No matter how carefully such bearings may be protected, they are worn out in a very short time by the grinding action of the fine cement which inevitably finds its way into them. By suspending my molds in rotating slings I avoid this objection entirely, and I have found that my apparatus remains unimpaired for months, where the ordinary bearings last only for hours.

It is highly essential that a trough be used to catch and retain the removed material from the inner surface of the concrete tube, otherwise it would be most difficult to secure the proper finish of the tubes.

It is equally important that when the concrete or cement is delivered to the mold or the tube, that it be deposited uniformly and evenly throughout the entire space. Otherwise it is extremely difficult to obtain tubes of uniform thickness. The devices which I use for this purpose I have found to be entirely successful.

Having now described my invention, what I claim is:

1. In the process of making centrifugally molded concrete pipes, the steps herein described of depositing concrete in a rotating mold and removing the laitance and other objectionable matter from the interior surface of the pipe by the wiping action of a body yielding in the direction of rotation of the mold and while said mold is still in rotation.

2. In the process of making centrifugally molded concrete pipes, the steps herein described of depositing the concrete in a rotating mold, removing the laitance and other objectionable matter from the interior surface of the pipe by a resilient wiper, trailing in the direction of the rotation of the mold and while the latter is still in rotation, and then depositing in the pipe while still rotating a thin interior coating of fine cement.

3. In the process of making centrifugally molded concrete pipes the steps which consist in forming in a centrifugal mold a concrete pipe section, wiping the inner surface to clean and true the same, depositing on said surface while still rotating a material such as neat cement to form a finishing coating, and smoothing the surface of such coating by a wiping or brushing action while the pipe is still in rotation.

4. The combination with a rotary mold for the manufacture of centrifugally molded concrete pipes, of overhead pulleys in fixed bearings, endless belts running over the same and pulleys on the mold which is slung in the endless belts, whereby the mold is supported and may be rotated by said belts, and steadying wheels engaging the pulleys on the mold for maintaining the mold in proper position.

5. The combination with a rotary mold for the manufacture of centrifugally molded concrete pipes, of an elongated cylindrical receptacle for concrete, revoluble about its longitudinal axis and movable concentrically into and out of said mold, the said receptacle having a longitudinal slot of the length of the mold for receiving and delivering concrete.

6. The combination with an apparatus for making centrifugal concrete pipes of an elongated trough adapted to be passed into and through the pipe when formed, and a resilient wiper, adapted to trail in the direction of rotation of the mold over the inner surface of the pipe and to thereby remove the laitance and other objectionable matter therefrom, and adapted to slide along the edge of said trough as a guide.

7. The combination with a rotary mold for the manufacture of centrifugal concrete pipes, of overhead pulleys in fixed bearings, endless belts running over the same, pulleys on the mold slung in the endless belts, and yielding steadying wheels on opposite sides of the mold engaging with the pulleys on the mold.

8. The combination with a rotary mold for the manufacture of centrifugal concrete pipes, of an elongated cylindrical receptacle capable of rotation on its axis, movable concentrically into and out of the mold, and provided with a longitudinal slot and a stirrer mounted in said cylinder and capable of being turned therein to assist in the even delivery of its contents when within the mold.

9. The combination with a machine for making centrifugal concrete pipe, of an elongated trough adapted to be passed into and through the pipe when formed, a supplemental tilting trough for the material of a finishing coating, adapted to travel along the edge of the main trough and be guided thereby into the pipe.

10. The combination with a machine for making centrifugal concrete pipe, of an elongated trough adapted to be passed into and through the pipe when formed, of a brush adapted to be forced back and forth along the edge of said trough in contact with the inner surface of the tube for cleaning and smoothing the same.

In testimony whereof I hereto affix my signature,

JOHN C. MITCHELL.